United States Patent [19]

Keil

[11] Patent Number: 4,554,296

[45] Date of Patent: Nov. 19, 1985

[54] POLYORGANOSILOXANE COMPOSITIONS

[75] Inventor: Joseph W. Keil, Midland, Mich.

[73] Assignee: Dow Corning Corporation, Midland, Mich.

[21] Appl. No.: 664,898

[22] Filed: Oct. 26, 1984

[51] Int. Cl.$^4$ ............................................. C08G 77/00
[52] U.S. Cl. ..................................... 521/154; 521/88; 521/91; 525/100; 525/101; 525/474; 525/479; 528/15; 528/29; 528/42
[58] Field of Search ................. 528/42, 15, 29; 525/474, 479, 100, 101; 521/88, 91, 154

[56] References Cited

U.S. PATENT DOCUMENTS

| | | | |
|---|---|---|---|
| 2,676,182 | 4/1954 | Daudt et al. | 260/448.2 |
| 3,038,000 | 6/1962 | Schmidt | 260/448.2 |
| 3,328,349 | 6/1967 | Lentz | 260/46.5 |
| 3,511,788 | 5/1970 | Keil | 260/2.5 |
| 3,809,783 | 5/1974 | Pittman et al. | 528/42 |
| 4,179,426 | 12/1979 | Steinbach et al. | 260/29.2 M |
| 4,489,201 | 12/1984 | von Au et al. | 528/42 |

*Primary Examiner*—Melvyn I. Marquis
*Attorney, Agent, or Firm*—Robert Spector

[57] ABSTRACT

Novel fluorine-containing polyorganosiloxanes comprise repeating units of the formula $[F(CF_2)_m(CH_2)_n]_p SiO_{(4-p)/2}$, $R_3SiO_{1/2}$ and $SiO_{4/2}$ where R represents a monovalent hydrocarbon radical containing from 1 to 20 carbon atoms, m has an average value from 1 to 20, n is 1 or 2 and p is 1, 2 or 3. The polyorganosiloxanes are particularly useful as stabilizers for foams prepared by introducing gaseous blowing agents into liquid polydimethylsiloxanes.

35 Claims, No Drawings

POLYORGANOSILOXANE COMPOSITIONS

Field of the Invention

This invention relates to polyorganosiloxane compositions. More particularly, this invention relates to novel polyorganosiloxane compositions containing $SiO_{4/2}$ and trihydrocarbylsiloxy units in addition to silicon-bonded fluorinated hydrocarbyloxy radicals, and the use of these compositions as profoamers for liquid polyorganosiloxane compositions.

BACKGROUND INFORMATION

Organosilanes and organosiloxanes containing polyfluorinated hydrocarbon radicals bonded to silicon by means of carbon atoms, oxygen atoms, or both are reported in the prior art. Resinous siloxane copolymers containing $(C_nF_{2n+1}CH_2CH_2)(CH_3)_2SiO_{1/2}$ units, where the value of n is from 1 to 10, and $SiO_{4/2}$ units are disclosed in U.S. Pat. No. 3,328,349 which issued on June 27, 1967 to C. W. Lentz. The patent teaches that the disclosed resins are useful as waterproofing agents and surfactants, for improving the strength of silicone rubber and as defoaming agents.

The products disclosed in the aforementioned Lentz patent are prepared by reacting a silane of the formula $C_nF_{2n+1}CH_2CH_2(CH_3)_2SiCl$ and/or a disiloxane of the formula $[C_nF_{2n+1}CH_2CH_2(CH_3)_2Si]_2O$, where n has a value of from 1 to 10, with sodium silicate which has been at least partially hydrolyzed using a mixture of concentrated aqueous hydrochloric acid and an alcohol such as ethanol or propanol. The cost of synthesizing the fluorine-containing silane and disiloxane reactants taught by Lentz could considerably increase the cost of the final resin.

U.S. Pat. No. 3,038,000 to Schmidt, which issued on June 5, 1962, discloses silanes and siloxanes containing fluorinated groups of the formula $XF_2C(CF_2)_mCH_2OOC(CH_2)_n$—and optionally, $XF_2C(CF_2)_mCH_2O$—bonded to silicon, where m and n are integers with a value of at least 2. These materials are allegedly useful as waterproofing and soilproofing agents for cellulosic materials and as lubricants which can function under high pressure conditions. The disclosed silanes and siloxanes are prepared by reacting a 1,1-dihydroperfluoro alcohol with silanes or siloxanes containing an omega-carboxyalkyl or omega-cyanoalkyl radical and, optionally, one or more chlorine atoms, bonded to silicon. The alcohol reacts with the carboxyl or cyano group in addition to reacting with any halogen atoms present in the organosilicon material. A disadvantage of the method taught by Schmidt is that it employs silanes or siloxanes containing cyanoalkyl or carboxyalkyl radicals bonded to silicon. As in the case of the aforementioned Lentz patent, synthesis of the required intermediates could add considerably to the cost of preparing the final product.

U.S. Pat. No. 3,511,788, which issued to J. Keil on May 12, 1970, discloses that stable foams can be prepared from organic liquids having surface tensions of at least 22.2 dynes per centimeter by including in the foamable composition a siloxane copolymer containing $SiO_{4/2}$ units $Q(CH_3)_2SiO_{1/2}$ units and $(CH_3)_3SiO_{1/2}$ units, where Q represents a "radical containing a solubilizing group." The purpose of the Q group is to make the copolymer compatible with organic liquids and plastisols with which it would otherwise be incompatible. It cannot be deduced from the teaching in the patent what effect the copolymers disclosed by Keil would have on the stability of foams or froths prepared from liquid polydimethylsiloxane compositions, which are outside the scope of the aforementioned Keil patent in that they typically exhibit surface tension values below Keil's lower limit of 22.2 dynes per centimeter.

It is an object of this invention to provide a novel class of fluorine containing polyorganosiloxanes that can be conveniently synthesized from available organosilicon reactants without requiring the preparation of relatively costly organosilicon intermediates.

It is also an object of this invention to provide foamable compositions comprising a liquid polydimethylsiloxane and one of the preferred fluorine-containing polyorganosiloxanes of this invention as a foam stabilizer.

SUMMARY OF THE INVENTION

The novel polyorganosiloxanes of this invention comprise siloxane units derived from at least one fluorinated alcohol, triorganosiloxy units, $SiO_{4/2}$ units and, optionally siloxane units derived from a specified class of hydroxyl-containing organic polymers. The polyorganosiloxanes are useful for stabilizing foams prepared from liquid polydimethylsiloxanes.

DETAILED DESCRIPTION OF THE INVENTION

The polyorganosiloxanes of this invention comprise $[F(CF_2)_m(CH_2)_nO]_pSiO_{(4-p)/2}$, $R_3SiO_{1/2}$ and $SiO_{4/2}$ units and from 0 to 10 percent, based on the weight of said polyorganosiloxane, of $GSiO_{3/2}$ units, where R represents a monovalent hydrocarbon radical containing from 1 to 20 carbon atoms, m is an integer having an average value of from 1 to 20, inclusive, n is 1 or 2, p is an integer from 1 to 3, inclusive, and G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl groups per molecule.

The polyorganosiloxanes of this invention can be prepared by reacting a benzene-soluble siloxane copolymer containing $R_3SiO_{1/2}$ and $SiO_{4/2}$ units and silicon-bonded hydroxyl groups with a fluorine-containing alcohol of the average formula $F(CF_2)_m(CH_2)_nOH$, where R, m and n are as defined hereinabove.

The benzene-soluble siloxane copolymers employed to prepare the polyorganosiloxanes of this invention have a complex, incompletely defined structure. For the purposes of this invention, a preferred group of copolymers can be fully characterized by a molar ratio of $R_3SiO_{1/2}$ to $SiO_{4/2}$ units of from 0.3 to 1.3, inclusive, a concentration of silicon-bonded hydroxyl groups of from 0.1 to 5% by weight, and solubility of the copolymers in hydrocarbon solvents such as benzene. The copolymers can optionally contain up to 10 mole percent, based on the total number of repeating units, of $R_2SiO$ units.

Resinous siloxane copolymers consisting of $R_3SiO_{1/2}$ units and $SiO_{4/2}$ units are known. These materials are described by Daudt et al. in U.S. Pat. No. 2,676,182 which issued on April 20, 1954. This patent is hereby incorporated herein in its entirety by reference as a teaching of the resinous siloxane copolymers which are suitable for preparing the polyorganosiloxanes of this invention. Briefly summarized, the copolymers are prepared by acidifying an aqueous solution of sodium silicate, such as No. 9 sodium silicate sold by DuPont ®, to the proper pH using a mixture of hydrochloric acid and isopropanol. The resulting acidic silica hydrosol is then treated with a source of $R_3SiO_{1/2}$ siloxane units, such as $R_3SiOCH_3$, $R_3SiCl$ or $R_3SiOSiR_3$, dissolved in a mixture of isopropanol and xylene. The molar ratio of $R_3SiO_{1/2}$ units to the $SiO_{4/2}$ units derived from the sodium silicate is from 0.3:1 to 1.3:1.

After being heated, the reaction mixture is cooled separated into an aqueous phase, which is discarded, and a nonaqueous phase comprising the siloxane copolymer, which is further washed with water to reduce its acid number and to remove water-soluble components, such as isopropyl alcohol. Preferred copolymers typically have sufficient acid remaining therein to provide an acid number of from 0.2 to 2.0.

Each R in the foregoing formulae represents a monovalent hydrocarbon radical and the hydrocarbon radicals in a given copolymer can be identical or different. R can be an alkyl radical such as methyl, ethyl, isopropyl, butyl or hexyl; an alkenyl radical such as vinyl or allyl; an aryl radical such as phenyl, tolyl or xylyl; an aralkyl radical such as beta-phenylethyl or beta-phenylpropyl; or a cycloaliphatic radical such as cyclopentyl, cyclohexyl or cyclohexenyl. Preferably all the R radicals are lower alkyl, although a minor portion of these radicals can be vinyl and/or phenyl to provide properties such as reactivity with silicon-bonded hydrogen atoms and low temperature stability. The siloxane copolymer further comprises from 0.1 to 5 percent by weight of silicon-bonded hydroxyl groups and may contain $R^2SiO$ units in addition to trace amounts of silicon-bonded alkoxy groups such as methoxy, ethoxy or isopropoxy radicals. The alkoxy groups can result from the particular method used to prepare the copolymer.

Preferred organosiloxane copolymers consist essentially of $(CH_3)_3SiO_{1/2}$ units and $SiO_{4/2}$ units, in the molar ratio stated above and from about 0.5 to 3 weight percent of silicon bonded hydroxyl groups.

Fluorine-containing alcohols that are reacted with the aforementioned siloxane copolymers are single compounds or mixtures of homologs exhibiting the average formula $F(CF_2)_m(CH_2)_nOH$ where m is one or more integers having an average value of from 1 to 20 and n is 1 or 2. Alcohols corresponding to the foregoing formula are commercially available.

A preferred class of fluorine-containing alcohols is obtained from the polymerization of tetrafluoroethylene to form a mixture of homologous oligomers containing from two to ten or more —$F_2CCF_2$— units per molecule. Each oligomer molecule also contains a hydroxyethyl group. A particularly preferred reactant of this type is reported to be a mixture of homologous alcohols having the average formula $F(CF_2)_8CH_2CH_2OH$ and is available as Zonyl ® BA Fluoroalcohol from E. I. Dupont deNemours and Co. (Inc.), Wilmington, Del.

At least one each of the aforementioned benzene-soluble siloxane copolymers is reacted with at least one fluorine-containing alcohol in the presence of a suitable organic liquid boiling from 30° to about 150° C. and in which all of the reactants are soluble at the temperature of the reaction. Preferred organic liquids form azeotropes with water, and include liquid aromatic hydrocarbons such as benzene, xylene and toluene. Other suitable organic reaction media include aliphatic, cycloaliphatic and chlorinated aliphatic hydrocarbons, such as hexane, heptane, cyclohexane, methylene chloride, and 1,1,1-trichloroethane, and ketones such as methyl isobutyl ketone.

The reaction between the siloxane copolymer and fluorine-containing alcohol can be conducted at room temperature. It is usually preferable to heat the reaction mixture to facilitate removal of the water formed as a by-product. Most preferably the reaction is conducted at the boiling point of the reaction mixture using as the reaction medium one of the aforementioned liquid hydrocarbons that forms an azeotrope with water. Catalytically effective amounts of known silanol condensation catalysts such as potassium hydroxide, organosulfonic acids such as trifluoromethanesulfonic acid and organic or inorganic tin compounds such as dibutyltin dilaurate and stannous octoate are desirably included in the reaction mixture. The concentration of catalyst is typically from 0.1 to about 1%, based on the total weight of reactants.

The concentration of fluorine-containing alcohol in the reaction mixture should be sufficient to react with at least a portion of the hydroxyl groups in the siloxane copolymer. As previously discussed, preferred copolymers contain from 0.5 to 3 percent by weight of silicon-bonded hydroxyl groups. Preferably the total hydroxyl content of the fluorine-containing alcohol is equal to from about 8 to about 40 mole %, based on the hydroxyl content of the siloxane copolymer. Fluorine-containing alcohols are incompatible with the polyorganosiloxanes of this invention in the absence of the organic liquid employed as a reaction medium. To avoid incompatible mixtures the concentration of preferred alcohols should not exceed the aforementioned limit of about 40 mole %, based on the hydroxyl groups present in the siloxane copolymer. For the preferred reactants exemplified hereinafter this limit is equivalent to a weight ratio of alcohol to copolymer of 20:80, respectively.

Preferably only one molecule of fluorine-containing alcohol reacts with any given silicon atom of the aforementioned siloxane copolymer, in which instance p of the foregoing formula would equal 1.

For preferred polyorganosiloxanes of this invention where R is methyl, the weight ratio of fluorine-containing units to other units in the polymer is from 0.02 to 0.2.

In addition to the aforementioned siloxane copolymer and fluorine-containing alcohol, the reaction mixture optionally may also contain a liquid or solubilized hydroxylated organic polymer which is compatible with the other ingredients of the reaction mixture. The polymer is represented by the formula GH, where G is as previously defined and H represents the hydrogen atom that is removed during the reaction of GH. Useful organic polymers of this type include homopolymers of ethylenically unsaturated alcohols such as allyl and cinnamyl alcohols, copolymers of these alcohols with ethylenically unsaturated hydrocarbons, polyoxyalkylene glycols and polyethers, each of which contain an average of at least one terminal unit per molecule that is derived from a saturated or ethylenically unsaturated alcohol are also suitable.

Preferred hydroxyl-containing polymers include styrene/allyl alcohol copolymers and polyethers, such as polyethylene oxide, which have been prepared in the presence of butyl or allyl alcohol as a chain initiating agent. Units derived from the aforementioned hydroxylated organic polymer can constitute up to 10% by weight of the present polyorganosiloxanes.

The polyorganosiloxanes of this invention are typically solid materials at room temperature and are soluble in organic liquids such as ketones and aromatic hydrocarbons and in liquid polydimethylsiloxanes.

Polyorganosiloxanes wherein R of the foregoing formula represents methyl constitute a preferred class of products of this invention. A 10% by weight solution of these polyorganosiloxanes in a liquid hydroxyl endblocked polydimethylsiloxane exhibiting a viscosity of 0.08 Pa.s at 25° C. typically exhibits a surface tension of less than $2.2 \times 10^{-4}$ newtons/cm. The polyorganosiloxanes are not very soluble in these polydimethylsiloxanes. These properties make the preferred products of this invention particularly useful as foam stabilizers or "profoamers" for liquid polydimethylsiloxane compositions. A profoamer stabilizes the cellular structure of froths generated by rapid stirring and/or introduction of a gaseous blowing agent, such as air, hydrogen or nitrogen, into a liquid. In the absence of a suitable profoamer a froth formed from a liquid polydimethylsiloxane composition disintegrates and reverts to a liquid shortly after stirring is discontinued or gas introduction ceases.

Cured foams can be prepared by including in the foamable compositions of this invention an organosiloxane containing 3 or more silicon-bonded hydrogen atoms per molecule. A suitable catalyst can also be present. The compositions also include one of the preferred fluorine-containing polyorganosiloxanes of this invention where R of the foregoing formula is methyl, and a liquid hydroxyl endblocked polydimethylsiloxane. Crosslinkers containing silicon bonded hydrogen atoms are conventionally used in room temperature vulcanizable (RTV) foamable polyorganosiloxane compositions in combination with thixotropic agents such as finely divided silica or carbon black and a hydroxyl compound.

Catalysts for promoting the formation and curing of foams prepared by the reaction of silicon bonded hydrogen atoms with silicon bonded hydroxyl groups are known in the art and include, among others, platinum group metals such as platinum, rhodium and palladium, compounds of these metals, such as chloroplatinic acid, and organic or inorganic tin compounds such as stannous octoate.

The utility of the polyorganosiloxanes of this invention as profoamers is unexpected in view of the teaching in the aforementioned Lentz patent that resins of similar composition function as defoaming agents.

The activity of the present reaction products as profoamers or foam stabilizers can be enhanced by incorporating in the profoamers repeating units derived from one of the aforementioned hydroxylated organic polymers, represented by GH, in the reaction mixture. While the reason for the improvement in activity is not completely understood, it is believed that the presence of these units reduces the solubility of the reaction product in the liquid polydimethylsiloxane.

When used as profoamer for foamable liquid polydimethylsiloxane compositions, the concentration of the present polyorganosiloxanes is typically from 0.1 to about 20% based on the total weight of the foamable composition.

The fluorine-containing polyorganosiloxanes of this invention can be advantageously used in combination with liquid polydiorganosiloxanes to impart lubricity to a variety of materials, particularly at metal-to-metal interfaces.

Because the present polyorganosiloxanes are incompatible with many organic polymers, the polyorganosiloxanes can be employed in combination with liquid polydimethylsiloxanes as internal lubricants for these organic polymers, as taught in U.S. Pat. No. 3,843,577 to Joseph Keil, which issued on Oct. 22, 1974. In addition to the epoxy resins disclosed in this patent, lubricating compositions containing the present polyorganosiloxanes as dispersing agents can be incorporated into other organic polymers, including polyolefins, polystyrene, saturated and unsaturated polyesters, polyamides, polyimides, polycarbonates, elastomeric polyurethanes and polymers derived from esters or other derivatives of ethylenically unsaturated acids, including acrylic, methacrylic and maleic acids.

The following examples are provided as illustrations of this invention and should not be interpreted as limiting the scope of the accompanying claims. All parts and percentages are by weight unless otherwise stated.

EXAMPLE 1

This example describes the preparation of a fluorine-containing polyorganosiloxane of this invention wherein the weight ratio of fluorine-containing organosiloxane units to $(CH_3)_3SiO_{1/2}$ and $SiO_{4/2}$ units is 1/9.

A glass reactor equipped with a thermometer, reflux condenser, mechanically driven stirrer and Dean-Stark apparatus to retain a portion of the condensate returning to the reactor, was charged with 121 parts of a 74.4% solution in xylene of a resinous siloxane copolymer, 10.0 parts of an alcohol having the average formula $F(CF_2)_8CH_2CH_2OH$ and available as Zonyl® BA fluoroalcohol, 68.5 parts of methyl isobutyl ketone, and 0.5 part of a 0.1 N solution of potassium hydroxide in ethanol. The siloxane copolymer consisted essentially of repeating units of the formulae $(CH_2)_3SiO_{1/2}$ and $SiO_{4/2}$ in a molar ratio of about 0.75:1.0, respectively and contained about 2.5% by weight of silicon-bonded hydroxyl groups. The resin is described in the aforementioned U.S. Pat. No. 2,676,182 to Daudt et al.

The contents of the reactor were heated at the boiling point for one hour, then cooled to 50° C. and neutralized to a pH of about 7 by bubbling carbon dioxide through the reaction mixture. The resultant mixture, which contained a polyorganosiloxane of this invention, was then combined with 100 parts of a trimethylsiloxy endblocked polydimethylsiloxane exhibiting a viscosity of 0.01 Pa.s and a surface tension of $2.03 \times 10^{-4}$ newtons/cm., and the volatile materials were then evaporated under reduced pressure. The evaporation was conducted by heating the reaction mixture and gradually reducing the pressure in the reaction vessel to 10 mm. of mercury. Heating of the reaction mixture was continued until the temperature of the reaction vessel reached 110° C. Under these conditions the fluorinated polyorganosiloxane of this invention and the polydimethylsiloxane would not be volatilized to any significant extent. The resultant clear solution exhibited a surface tension of $1.92 \times 10^{-4}$ newtons/cm., is referred to hereinafter as reaction product (A) and contains a polyorganosiloxane with repeating units of the average formula $F(CF_2)_8CH_2CH_2OSiO_{3/2}$, $(CH_3)_3SiO_{1/2}$ and $SiO_{4/2}$.

EXAMPLE 2

This example demonstrates the use of a reaction product of this invention as a stabilizer for a foamable liquid polyorganosiloxane composition.

The following materials were placed in a glass container, mixed to obtain a homogeneous composition (I) and allowed to foam and cure at ambient temperature,
9.5 parts of a hydroxyl endblocked polydimethylsiloxane (1) exhibiting a viscosity of 2 Pa.s at 25° C.;
1 part of a hydroxyl endblocked polydimethylsiloxane (2) exhibiting a viscosity of 0.04 Pa.s at 25° C. and containing about 3.3% by weight of silicon-bonded hydroxyl groups;
0.5 part of reaction product (A), described in the preceding Example 1;
0.5 part of a trimethylsiloxy endblocked polymethylhydrogensiloxane having a silicon-bonded hydrogen content of 1.68 and an average of 57 methylhydrogensiloxane units per molecule; and
0.3 part stannous octoate.

A control composition (II) was prepared using 10 parts of polydimethylsiloxane (1), no reaction product (A), and the amounts of polydimethylsiloxane (2), polymethylhydrogensiloxane and stannous octoate specified for composition (I). The container used was identical to that used for composition (I).

The final foam height and cell density of the foams obtained from compositions (I) and (II) are summarized below:

| Composition | Foam Height (cm.) | No. of Cells/Linear Cm. |
| --- | --- | --- |
| (I) | 2.5 | 35 |
| (II) (control) | 1.5 | 5.1 |

The foregoing data demonstrate the ability of reaction product (A), a product of this invention, to function as a profoamer by retaining a larger portion of the initial height and cell concentration in the cured foam.

EXAMPLE 3

This example demonstrates the ability of a fluorine-containing reaction product of this invention to stabilize a dispersion of polytetrafluoroethylene in a liquid polyorganosiloxane.

A composition (III) was prepared using the following ingredients:
52 parts of a trimethylsiloxy endblocked polydimethylsiloxane exhibiting a viscosity of 0.02 Pa.s at 25° C.;
40 parts of an aqueous dispersion containing 30% by weight of polytetrafluoroethylene, available as Teflon ® 30 from E. I. duPont deNemours and Company;
8 parts of reaction product (A) referred to in the preceding Example 1.

A portion of the resultant composition was spread on a glass plate and placed in an oven heated to a temperature of 60° C. to remove the water. The product was a stable dispersion of polytetrafluoroethylene in polydimethylsiloxane.

A second composition (IV) was prepared using the same types and amounts of ingredients as composition (III) but omitting reaction product (A). In this instance the polytetrafluoroethylene dispersion agglomerated to form a solid mass when the water was removed.

EXAMPLE 4

This example demonstrates the utility of a reaction product of this invention as a stabilizer for froths obtained by introducing air into a liquid polydimethylsiloxane.

A reaction product of this invention was prepared by reacting 117.0 parts of a 71.75% by weight solution of the siloxane copolymer described in the preceding Example 1 with 16 parts of Zonyl ® BA alcohol in the presence of 66.5 parts of xylene and 0.5 part of stannous octoate. The reaction mixture was heated for one and one half hours in a glass reactor equipped with a reflux condenser and Dean Stark apparatus. The water formed as a by-product of the reaction was continuously removed by azeotropic distillation. Following completion of the reaction period, 100 parts of a trimethylsiloxy endblocked polydimethylsiloxane exhibiting a viscosity of 0.01 Pa.s at 25° C. were added to the reactor and the xylene was removed by distillation under reduced pressure as described in Example 1 to yield reaction product (B). The weight ratio of the combination of $SiO_{4/2}$ and $(CH_3)_3SiO_{1/2}$ units to $F(CF_2)_8CH_2CH_2OSiO_{3/2}$ units in the reaction product was 84:16.

A mixture containing 180 parts of a hydroxyl endblocked polydimethylsiloxane exhibiting a viscosity of 0.08 Pa.s at 25° C. and 20 parts of the aforementioned reaction product (B) formed a froth when stirred for 10 minutes using a high speed planetary type mixer equipped with a wire stirrer. The froth remained for several minutes after the mixing was discontinued. By comparison, when the same polydimethylsiloxane was mixed under identical conditions in the absence of reaction product (B), no froth was produced.

To obtain a quantitative measure of foam stability, 90 parts of the aforementioned polydimethylsiloxane exhibiting a viscosity of 0.08 Pa.s and 10 parts of reaction product (B) described in the first part of this example were placed in a graduated cylinder. The initial volume of the liquid was 210 cc. Air was then introduced into the mixture for 3 minutes at a rate of 100 cc per minute to generate a foam. At the end of this period, the density of the foam was 0.3 g./cc. and 90 cc. of liquid remained in the cylinder. The stability of the foam was determined by measuring the rate at which liquid drained from the foam into the lower portion of the graduated cylinder. A total of 60 cc. of liquid drained in 9 minutes.

When air was introduced as described hereinabove into a sample of the aforementioned polydimethylsiloxane (viscosity=0.08 Pa.s) that did not contain reaction product (B), no foam was produced.

EXAMPLE 5

This example discloses two reaction products of this invention that are prepared using a hydroxyl-containing organic polymer.

A glass reactor equipped as described in the preceding Example 1 was charged with 116.9 parts of a 73% solution of the siloxane copolymer described in Example 1, 7.5 parts of Zonyl BA fluorinated alcohol, 7.5 parts of a styrene/allyl alcohol copolymer exhibiting a molecular weight of 1500 and available as RJ-100 ® from the Monsanto Chemical Company, 68.1 parts of xylene and 0.5 part of a 0.1 N ethanolic potassium hydroxide solution. The resultant reaction mixture was heated at the boiling point for one hour with removal of the water that formed as a by-product.

Following completion of the heating cycle, the reaction mixture was allowed to cool to 70° C., at which time it was treated with gaseous carbon dioxide for 30 minutes. The reaction mixture was then combined with 100 parts of a trimethylsiloxy endblocked polydimethylsiloxane exhibiting a viscosity of 0.01 Pa.s and the xylene together with volatile materials was removed under reduced pressure as described in Example 1 to yield reaction product (C).

Reaction products (C) and (D) exhibited repeating units of the formula $F(CF_2)_8CH_2CH_2OSiO_{3/2}$, $(CH_3)_3SiO_{1/2}$, $SiO_{4/2}$ and $GSiO_{3/2}$ where G represents the residue remaining following removal of a hydrogen atom from a hydroxyl group of the aforementioned RJ-100 polymer.

The foregoing procedure was repeated, with the exception that 11.3 parts of Zonyl BA alcohol and 3.8 parts of RJ-100 were used, to yield reaction product (D).

Reaction products (C) and (D) were stirred at high speed using a planetary type mixer equipped with a wire stirrer. Reaction product (D) formed a stable, creamy froth which did not collapse when stirring was discontinued. Reaction product (C) did not form a stable froth due to its lower fluorine content.

Mixtures containing 10 parts of reaction mixture (C) or (D) and 90 parts of a hydroxyl endblocked polydimethylsiloxane exhibiting a viscosity of 0.08 Pa.s at 25° C. were placed in graduated cylinders. A stream of air was then introduced near the bottom of the liquid at a flow rate of 100 cc. per minute for 3 minutes. The times required for ½ of the liquid to drain from the resultant foams after the flow of air had been discontinued, were 10 minutes for reaction product (C) and 12 minutes for reaction product (D).

That which is claimed is:

1. A polyorganosiloxane comprising $[F(CF_2)_m(CH_2)_nO]SiO_{(4-p)/2}$, $R_3SiO_{1/2}$ and $SiO_{4/2}$ units, silicon-bonded hydroxyl groups, and from 0 to 10 percent, based on the weight of said polyorganosiloxane, of $GSiO_{3/2}$ units, where R represents a monovalent hydrocarbon radical containing from 1 to 20 carbon atoms, m is an integer having an average value of from 1 to 20, inclusive, n is 1 or 2, p is an integer from 1 to 3, inclusive, and G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule.

2. A polyorganosiloxane according to claim 1 where the molar ratio of $R_3SiO_{1/2}$ units to the total number of $[F(CF_2)_m(CH_2)_nO]_pSiO_{(4-p)/2}$, $SiO_{4/2}$ units and $GSiO_{3/2}$ units is from 0.3 to 1.3.

3. A polyorganosiloxane according to claim 1 where in each of said fluorine-containing units m represents an even integer that is identical or different with respect to the value of m in other units and the average value of m is 8, n is 2 and p is 1.

4. A polyorganosiloxane according to claim 1 where R represents a lower alkyl radical.

5. A polyorganosiloxane according to claim 4 where R is methyl.

6. A polyorganosiloxane according to claim 3 where R is methyl.

7. A polyorganosiloxane according to claim 6 where the weight ratio of $F(CF_2)_m(CH_2)_nO_pSiO_{(4-p)/2}$ units to the other units present in said polyorganosiloxane is from 0.02 to 0.2.

8. A polyorganosiloxane according to claim 6 where the concentration of $[F(CF_2)_m(CH_2)_2]_pSiO_{(4-p)/2}$ units is sufficient to impart a surface tension of less than $2.2 \times 10^{-4}$ newtons per centimeter at 25° C. to a 10% by weight solution of said polyorganosiloxane in a hydroxyl endblocked polydimethylsiloxane exhibiting a viscosity of 0.08 Pa.s at 25° C.

9. A polyorganosiloxane according to claim 1 where G represents the residue of a copolymer of styrene and allyl alcohol or an allyl alcohol-terminated polyethylene oxide.

10. A polyorganosiloxane according to claim 9 where the $GSiO_{3/2}$ units constitute about 7.5 weight percent of said polyorganosiloxane.

11. A polyorganosiloxane according to claim 1 which is the product obtained by reacting a mixture comprising
(a) a solubilized, resinous, benzene-soluble siloxane copolymer consisting essentially of $R_3SiO_{1/2}$ and $SiO_{4/2}$ units in a ratio of from 0.3 to 1.3 $R_3SiO_{1/2}$ unit per $SiO_{4/2}$ unit, and from 0.1 to 5% by weight of silicon-bonded hydroxyl groups, where each R independently represents a monovalent hydrocarbon radical containing from 1 to 20 carbon atoms;
(b) up to a stoichiometric amount, based on the number of silicon-bonded hydroxyl groups present in said copolymer, of a fluorine-containing alcohol of the average formula $F(CF_2)_m(CH_2)_nOH$ and, from 0 to 10 weight percent, based on the weight of total reactants, of a polymer represented by GH, where GH represents a compatible liquid or solubilized linear organic polymer selected from the group consisting of homopolymers of ethylenically unsaturated alcohols, copolymers of these alcohols with ethylenically unsaturated hydrocarbons, polyethers, and polyoxyalkylene glycols, where said organic polymers contain an average of at least one terminal hydroxyl group per molecule.

12. A polyorganosiloxane according to claim 11 where the mixture is reacted in the presence of an organic liquid exhibiting a boiling point under ambient conditions of from 30° to 150° C. and which is a solvent for all of the reactants.

13. A polyorganosiloxane according to claim 12 where said organic liquid is an aliphatic, cycloaliphatic, aromatic or chlorinated aliphatic hydrocarbon or a ketone.

14. A polyorganosiloxane according to claim 12 where said organic liquid is benzene, toluene, xylene, or methyl isobutyl ketone.

15. Polyorganosiloxane resin according to claim 11 where the mixture is reacted in the presence of a silanol condensation catalyst.

16. A polyorganosiloxane according to claim 15 where the silanol condensation catalyst is potassium hydroxide or an inorganic or organic tin compound, the reaction is conducted at the boiling point of the reaction mixture and the water formed as a by-product is removed from the reaction mixture.

17. A polyorganosiloxane according to claim 11 where the siloxane copolymer contains the units $(CH_3)SiO_{1/2}$ and $SiO_{4/2}$ in a molar ratio of about 0.75:1, respectively, and about 2.5% by weight of silicon-bonded hydroxyl groups, the fluorine-containing alcohol is represented by the average formula F(CF$_2$)$_8$CH$_2$CH$_2$OH and is present in an amount sufficient to react with from 58 to 98 mole % of the hydroxyl groups present in the polyorganosiloxane, the reaction is conducted at the boiling point of the reaction medium and in the presence of potassium hydroxide or stannous octoate as a silanol condensation catalyst.

18. A polyorganosiloxane according to claim 11 where said organic polymer is a copolymer of allyl alcohol and styrene or a polyethylene oxide containing at least one terminal unit per molecule derived from allyl alcohol.

19. A foamable composition comprising a liquid polydimethylsiloxane and the polyorganosiloxane of claim 1 in an amount sufficient to stabilize a foam obtained by introducing a gaseous blowing agent into said composition, where R is methyl and the concentration of said F(CF$_2$)$_m$(CH$_2$)$_n$OSiO$_{3/2}$ units is sufficient to impart a surface tension of less than $2.2 \times 10^{-4}$ newtons per centimeter to a 10% by weight solution of said polyorganosiloxane in a hydroxyl endblocked polydimethylsiloxane exhibiting a viscosity of 0.08 Pa.s at 25° C.

20. A composition according to claim 19 where said blowing agent is air.

21. A composition according to claim 19 where said polydimethylsiloxane contains hydroxyl groups at the terminal positions.

22. A composition according to claim 21 where the blowing agent is hydrogen produced by the reaction of hydroxyl groups with an organosiloxane containing three or more silicon bonded hydrogen atoms per molecule.

23. A composition according to claim 22 where said organosiloxane is present in an amount sufficient to crosslink said polydimethylsiloxane.

24. A composition according to claim 24 where the composition includes a catalytically effective amount of a catalyst selected from the platinum group metals and compounds of said metals.

25. A composition according to claim 24 where said catalyst is a platinum compound.

26. A composition according to claim 19 where said polyorganosiloxane contains repeating units of the formula CH$_3$SiO$_{1/2}$, SiO$_{4/2}$ and fluorine-containing units of the general formula F(CF$_2$)$_m$CH$_2$CH$_2$OSiO$_{3/2}$ where in each molecule of said polyorganosiloxane m represents an even integer from 2 to 10 and the average value of m is 8.

27. A method for preparing a foam, said method comprising introducing a gaseous blowing agent into a composition comprising a liquid polydimethylsiloxane and the polyorganosiloxane of claim 1 in an amount sufficient to stabilize a foam obtained by introducing a gaseous blowing agent into said composition, where R is methyl and the concentration of said F(CF$_2$)$_m$(CH$_2$)$_n$OSiO$_{3/2}$ units is sufficient to impart a surface tension of less than $2.2 \times 10^{-4}$ newtons per centimeter to a 10% by weight solution of said polyorganosiloxane in a hydroxyl endblocked polydimethylsiloxane exhibiting a viscosity of 0.08 Pa.s at 25° C.

28. A method according to claim 27 where said blowing agent is air.

29. A method according to claim 27 where said polydimethylsiloxane contains hydroxyl groups at the terminal positions.

30. A method according to claim 29 where the blowing agent is hydrogen produced by the reaction of hydroxyl groups with an organosiloxane containing three or more silicone bonded hydrogen atoms per molecule.

31. A method according to claim 30 where said organosiloxane is present in an amount sufficient to crosslink said polydimethylsiloxane.

32. A method according to claim 30 where the composition includes a catalytically effective amount of a catalyst selected from the platinum group metals and compounds of said metals.

33. A method according to claim 32 where said catalyst is a platinum compound.

34. A method according to claim 27 where said polyorganosiloxane contains repeating units of the formula (CH$_3$)$_3$SiO$_{1/2}$, SiO$_{4/2}$ and fluorine-containing units of the average formula F(CH$_2$)$_m$CH$_2$CH$_2$OSiO$_{3/2}$ where in each molecule of said polyorganosiloxane m represents an even integer having an average value from 2 to 10.

35. A method according to claim 34 where the average value of m is 8.

* * * * *